United States Patent [19]
Wertz

[11] Patent Number: 4,730,798
[45] Date of Patent: Mar. 15, 1988

[54] AUTONOMOUS SPACECRAFT CONTROLLER AND RELATED METHOD

[76] Inventor: James R. Wertz, 2362 W. 228th St., Torrance, Calif. 90501

[21] Appl. No.: 709,566

[22] Filed: Mar. 8, 1985

[51] Int. Cl.$^4$ ............................................. B64G 1/36
[52] U.S. Cl. .................................... 244/171; 244/169; 244/164
[58] Field of Search .................. 244/158 R, 176, 171, 244/164, 169; 364/459, 444

[56] References Cited

U.S. PATENT DOCUMENTS

| | | | |
|---|---|---|---|
| 3,359,407 | 12/1967 | Paige | 364/459 |
| 3,490,719 | 1/1970 | Gantor et al. | 244/176 |
| 3,643,897 | 2/1972 | Johnson | 244/176 |
| 4,174,819 | 11/1979 | Bruderk et al. | 244/176 |

Primary Examiner—Joseph F. Peters, Jr.
Assistant Examiner—Rodney Corl
Attorney, Agent, or Firm—Noel F. Heal

[57] ABSTRACT

A controller for effecting transistion of a spacecraft from one orbit to another without reliance on ground-based control stations. The controller as disclosed includes at least two conical earth sensors which are normally employed for detection and control of spacecraft orientation, to provide signals indicative of altitude. When the spacecraft altitude is below a selected threshold, the controller activates a rocket motor to raise the high point of the orbit. A second comparison, with a low threshold value of sensed angular diameter of the earth, indicates when a desired orbital altitude is first reached. The controller, and a related method for its use, enable a spacecraft to effect a transistion between orbits without complex on-board computers and without significant control from the ground.

12 Claims, 3 Drawing Figures

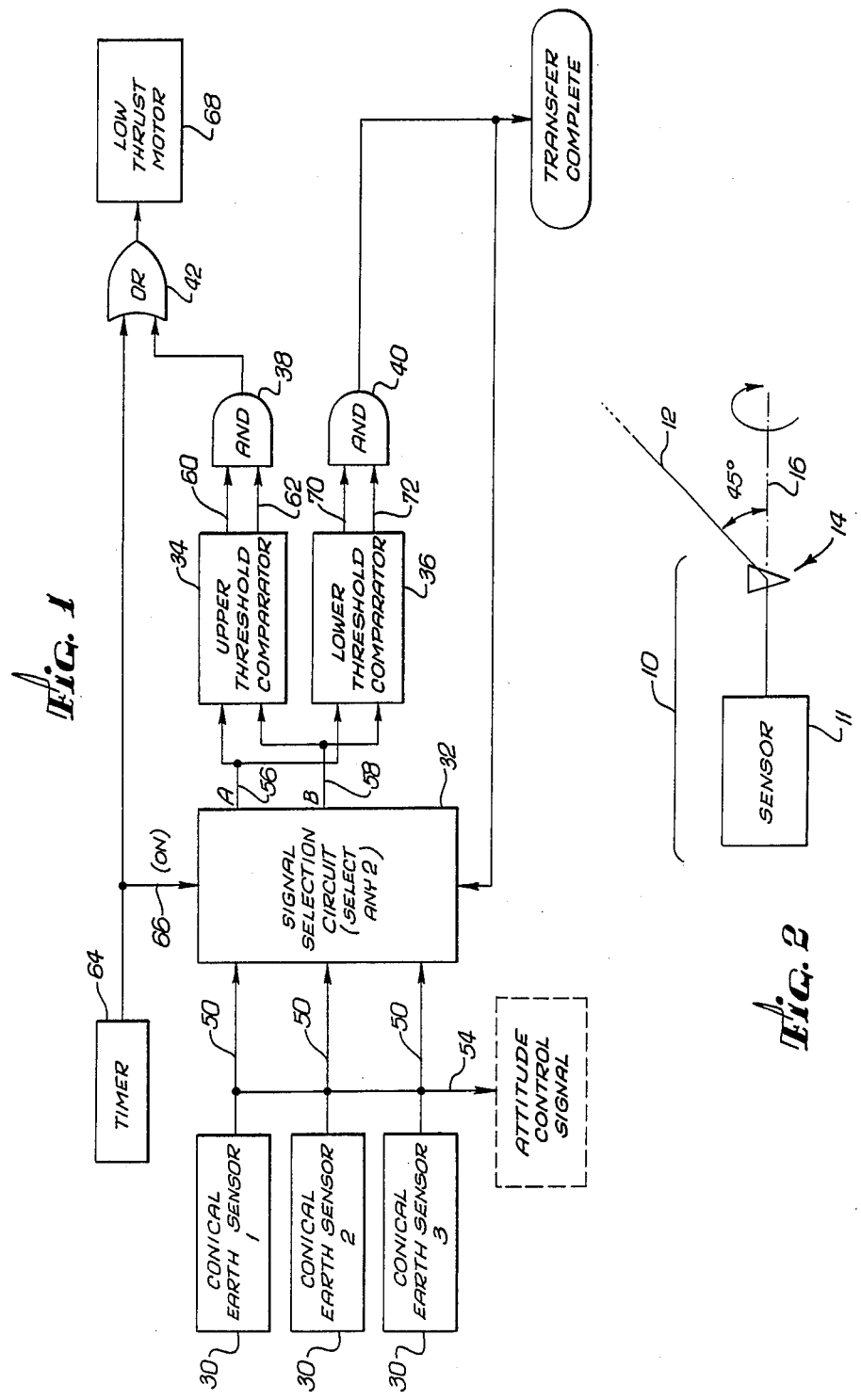

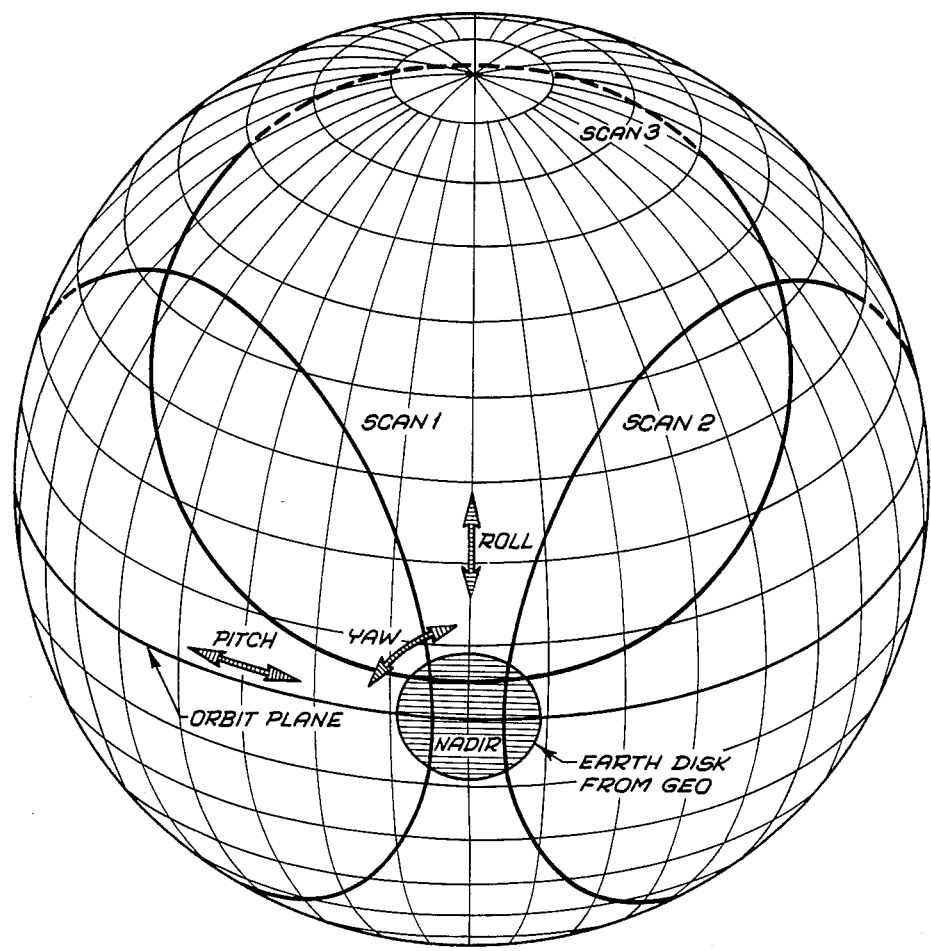

4,730,798

AUTONOMOUS SPACECRAFT CONTROLLER AND RELATED METHOD

BACKGROUND OF THE INVENTION

This invention relates generally to spacecraft, and more particularly, to techniques for effecting a transistion from one planetary orbit to another. A recurring requirement in controlling spacecraft is to be able to change the orbit of the craft, for example from a relatively low parking orbit about the earth to a much higher geosynchronous orbit, in which the period of revolution is twentyfour hours. Geosynchronous orbits are frequently used for communications satellites, weather observation, and so forth.

A space vehicle can be moved from a low circular orbit to a higher circular orbit by as few as two "burns" of a rocket motor. As is well understood, the orbit of an unpowered spacecraft, or any object, about a larger body is elliptical, with the larger body being located at one focus of the elipse. When rotation about the earth is being considered, the point in the orbit that is closest to Earth is called the perigee, and the furthest point from Earth is called the apogee. A circular orbit is, of course, merely a special case of the elliptical one. A first burn can be used to raise the apogee or high point of the orbit to a desired level, and a second burn performed at the apogee can be used to circularize the orbit. A more common technique is to employ a low-thrust motor and multiple burns. A first set of burns is used to raise the high point of the orbit, each burn occurring at the perigee or low point of the orbit. Another set of burns at the apogee is used to circularize the orbit. This approach requires a motor of much lower thrust than if only two burns are used, and the cost of the spacecraft is lower. Another important advantage is that the acceleration forces on the vehicle are low enough to permit the safe deployment of antennas and other equipment while in the low-altitude parking orbit.

In both approaches described, the position of the spacecraft has to be predicted to a high degree of precision, so that the burns can be initiated as near as possible to the low or high points of the orbit. Tracking of spacecraft for this purpose has traditionally been a function performed on the ground, based on information derived from radio signals processed at a number of tracking stations on the ground. Not only is this a complex and expensive task, but accurate prediction is especially difficult at low orbital altitudes.

For some types of missions, it would be preferable to provide the spacecraft with a form of control that was independent of the use of ground stations for position determination. In the past, building a more autonomous spacecraft has been synonymous with providing complex on-board controllers using programmable computers. Even with the high degree of autonomy provided by on-board computers, position determination must still be provided from ground stations.

Ideally, some spacecraft missions require an autonomous controller to effect transisiton from one orbit to another, but without complex on-board computers, and without continued intervention from ground stations. The present invention is directed to this end.

SUMMARY OF THE INVENTION

The present invention resides in an autonomous controller and a related method, for use in a spacecraft to effect a transition from one orbit about a planetary body to another, without reelying on ground stations for position information. Briefly, and in general terms, the controller of the invention comprises sensing means located entirely on board the spacecraft, for providing a signal indicative of the angular diameter of the planetary body, and comparator means, for comparing the signal provided by the sensing means with a threshold signal indicative of an angular diameter equivalent to an altitude at which a spacecraft motor is to be controlled, the comparator means including means for generating a motor control signal.

In the preferred form of the invention, there are at least two sensing means and two comparator means. The sensing means are of a type typically used for attitude control on spacecraft, and they may also perform this function in conjunction with that of the present invention. The controller may then include means for logically ANDing the control signals from the comparator means, to provide a more reliable indication that a desired altitude has been reached.

More specifically, in a preferred form of the invention, the controller includes three identical sensors, and means for selecting any two of the three for connection to the comparator means. The sensors in this preferred embodiment are conical earth sensors of a type long used for attitude sensing and control on spacecraft. Each sensor includes means for scanning a sensing beam through a conical path and detecting the angular positions at which the beam passes through the edge of the earth's disk. The three sensors are oriented to provide beam paths that sweep across the earth's disk in equal arcs.

In the preferred embodiment of the invention, the controller includes an upper threshold comparator circuit, for the detection of an upper limit of angular diameter of the earth, which will result in the activation of the rocket motor, and a lower threshold comparator circuit for the detection of a lower limit of angular diameter, which will result in an indication of completion of the orbital transfer process.

Optionally, the controller also includes timer means, for timing the occurrence of a first activation of the rocket motor. This is necessary if the initial orbit is circular.

The method of the invention includes the steps of initially activating a rocket motor for a selected period, to begin transition from a first orbit to a second orbit, continually sensing the angular diameter of the earth or other body, comparing the sensed angular diameter with a predetermined upper threshold value corresponding to an orbital altitude at which the rocket motor is to be activated, activating the rocket motor whenever the sensed angular diameter exceeds the upper threshold value, and deactivating the rocket motor whenever the sensed angular diameter is less than the upper threshold value. The method may also include the steps of comparing the sensed angular diameter with a predetermined lower threshold value, indicative of a target orbital altitude, and indicating completion of the first phase of orbital transfer, in which the orbit apogee has been raised to a desired level. For the second phase, i.e. circularization of the orbit, the result of the upper threshold comparison is temporarily ignored, and the result of the lower threshold comparison is used to control motor burning at orbital apogee.

It willl be appreciated from the foregoing that the present invention represents a significant advance in the field of orbital control of spacecraft. In particular, the invention provides a basically autonomous controller that is effective to change the orbit of a spacecraft without continual control from ground stations, and without complex control equipment on the spacecraft. Other aspects and advantages of the invention will become apparent from the following more detailed description, taken in conjunction with the accompanying drawings.

BRIEF DESCRIPTION OF THE DRAWINGS

FIG. 1 is a block diagram of an autonomous controller constructed in accordance with the present invention;

FIG. 2 is a simplified schematic view of a concial earth scanner and its scanning path; and FIG. 3 is a simplified view of a celestial sphere having the spacecraft at its center, and showing the earth's disk as it would appear from a geosynchronous orbit, and the projected scan paths of three conical earth scanners.

DESCRIPTION OF THE PREFERRED EMBODIMENT

As shown in the drawings for purposes of ilustration, the present invention is concerned with techniques for controlling a spacecraft to effect a transition from one orbit to another, such as from a low-altitude orbit around the earth to a geosynchronous orbit with a twenty-four-hour period. In contrast to prior approaches to the problem, the present invention employs a largely autonomous controller on board the spacecraft.

In many spacecraft, detection and correction of the vehicle orientation is performed by means of two or more conical earth scanners. Each scanner, indicated by reference numeral 10 in FIG. 2, includes a sensor 11, and controls a scanning beam 12 to sweep it through a conical path with a half-angle of approximately 45°, as determined by a refracting element 14, which is rotated about a pointing axis 16. The sensor 11 determines when the beam 12 passes through the edge of the earth's disk, shown at 18 in FIG. 3. A common approach is to sense carbon dioxide in the upper atmosphere. Signals are generated by the sensor at both transitions presented by the edge of the earth's disk, and the time spacing of these signals therefore provides an indication of the angular diameter of the earth as viewed from the spacecraft. If two such scanners are used, and if the vehicle is properly oriented with respect to the earth, the scanners paths, shown at 20 and 22, will intersect the earth's disk 18 in such a way as to trace two equal arcs. This provides a basis for controlling the orientation of the spacecraft. If the arcs of intersection with the earth's disk are unequal, an appropriate correction can be made to the orientation of the craft.

In accordance with the invention, the information provided by the scanners for orientation detection and control is also employed for altitude detection and control. The controller that accomplishes this is shown in FIG. 1, and includes three conical earth sensors 30, a signal selection circuit 32, an upper threshold comparator 34, a lower threshold comparator 36, two AND gates 38 and 40, and an OR gate 42. The conical earth sensors 30 generate signals on lines 50 to the signal selection circuit 32, but the signals are also transmitted over line 54, which represents an attitude control signal used in accordance with well known techniques to control the attitude of the spacecraft.

The conical earth sensors 30 may be of any suitable design. In the particular configuration illustrated, the conical sensors employed are manufactured by Ithaco, Spacecraft Instruments Division, Ithaca, N.Y. For control of orbits about the moon, the sun, or planets other than the Earth, different means would be needed for sensing the angular diameter of those bodies, but the principle of the invention would still apply.

The signal selection circuitry 32 functions to select two of the three signals input to it, and provides these to the comparator circuits 34 and 36 on lines 56 and 58, each of which is coupled as an input to the comparators. The upper threshold comparator 34 compares both of the selected inputs with an internal upper threshold value, which has been previously calculated to be equivalent in value to an altitude at which rocket firing is to be initiated. The results of the two comparisons appear on output lines 60 and 62, and are binary indications of whether the input value exceeds the selected upper threshold. These two output signals are ANDed together in AND gate 38, and the resulting output signal is transmitted to OR gate 42. The other input to the OR gate 32 is derived from a conventional, and optional, timer 64. The purpose of the timer 64 is to provide an initial control signal to begin a transition sequence from one orbit to another, and, simultaneously, to turn on the controller, as indicated by the control signal line 66 to the signal selection circuit 38. The output of the OR gate 42 is connected to a low-thrust rocket motor 68.

When the timer 64 generates a control signal and first activates the motor 68, the motor is turned on for a predetermined time, through the OR gate 42. This initial burn places the spececraft in a slightly elliptical orbit, and the next function of the controller is to detect when the spacecraft is again approaching its perigee,so that a subsequent motor burn will continue to lift the apogee of the orbit as deisred.

Each time the spacecraft approaches the near-point or perigee of its orbit, the upper threshold comparator 34 will generate a control signal to activate the motor 68. The spacecraft will continue through perigee, and will again pass through the threshold altitude, resulting in deactivation of the motor 68. This process continues repeatedly until the apogee of the orbit is raised to a predetermined level, as sensed by the lower threshold comparator 36. When this upper altitude is sensed, as indicated by outputs on lines 70 and 72 to AND gate 40, and output signal is generated at AND gate 40 and the first phase of the orbital transfer is complete, as indicated by reference numeral 74.

The second phase of the transfer involves raising the perigee of the orbit to make it nearly circular, by repeatedly activating the motor 68 at the apogee. Since the position of the spacecraft is easier to sense at apogee than at perigee, the second phase can be accomplished by ground control if desired, using the "transfer complete" signal 74 to switch off the autonomous controller and to signal a ground station of the status. Alternatively, the transfer-complete signal 74 could be used to reconfigure the autonomous controller to perform the second phase of the orbital transfer. For example, if the upper threshold comparator 34 were modified to employ a low threshold indicative of approaching apogee, AND gate 38 would operate to active the motor 68 each time that apogee was approached. This would have the effect of raising the perigee. A simple low-accuracy timer (not shown) would be actuated each time that apogee was sensed, and would generate an enabling signal to AND gate 40, to enable the gate only during a span of time that includes a passage through the perigee point. In this manner, the lower threshold comparator 36 would operate to detect when the perigee point had been raised to the same level as the apogee. The transfer-complete signal 74 would then indicate that the second phase of the orbital transfer was complete.

An important advantage of this autonomous controller approach to orbital transfer is that it is relatively resistant to catastrophic failure. A recurring difficulty in effecting orbital transfer of spacecraft, such as satellites, is that, if the vehicle becomes incorrectly oriented, activation of its motor can result in total loss of orbital control, and sometimes in total loss of the motor propellant. In the described arrangement, if orientation is lost the conical earth sensors 30 will not produce altitude signals that are in agreement, and the motor 68 cannot then be activated. Therefore, fuel will not be expended, and recovery of the vehicle will be facilitated. Not only is this novel controller autonomous, but it also shuts down the drive motor automatically upon loss of orientation of the spacecraft.

For further improvement in orbital accuracy, a small on-board computer may be added to compute a final burn time. Since each burn time under the autonomous controller is determined by altitude observations, it is probable that the last burn that raises apogee to the desired level may be too long, and overshoot may result. This difficulty may be overcome by setting the lower threshold (which senses upper altitude) just short of the desired level, and then computing a final burn time more accurately with the on-board computer.

It will be appreciated from the foregoing that the present invention represents a significant advance in the field of orbital control of spacecraft. In particular, the invention provides a simple autonomous controller that can raise (or lower) an orbit from one level to another without support from ground stations, and based only on altitude measurements made by on-board sensors. It will also be appreciated that, although a specific embodiment of the invention has been described in detail for purposes of illustration, various modifications may be made without departing from the spirit and scope of the invention. For example, although the invention is described in terms of an earthorbiting spacecraft, the principles of the invention apply equally well to vehicles orbiting other planets, satellites of planets, the sun, or other stars. Thus it will be understood that the term "celestial body" used in some of the appended claims is not intended to be strictly limited to planets, or even to bodies within the solar system.

I claim:

1. An autonomous controller for use in a spacecraft, to effect a transition at low acceleration from one elliptical orbit about a celestial body to another such orbit, the controller comprising:

sensing means located entirely on board the spacecraft, for providing a signal indicative of the angular diameter of the celestial body; and comparator means, for comparing the signal provided by the sensing means with a threshold signal indicative of an angular diameter equivalent to a threshold altitude at points in the orbit substantially removed from and spaced symmetrically with respect to the apogee and perigee, at which points a spacecraft motor is to be controlled, the comparator means including means for generating a spacecraft motor control signal, to activate a spacecraft motor at relatively low thrust over a relatively long segment of the spacecraft orbit extending between the points at which the threshold altitude is sensed, whereby the signal provided by the sensing means has a relatively high rate of change at the level of the threshold signal, to facilitate precise detection of the threshold and generation of the spacecraft motor control signal.

2. An autonomous controller as set forth in claim 1 in which:

there are at least two sensing means and two comparator means; and the controller further includes means for logically ANDing the control signals from the comparator means, to provide a more reliable indication that a desired altitude has been reached.

3. An autonomous controller for use in a spacecraft, to effect a transition at low acceleration from one elliptical orbit about a celestial body to another, higher orbit, the controller comprising:

sensing means located entirely on board the spacecraft, for providing a signal indicative of the angular diameter of the celestial body;

first comparator means, for comparing the signal provided by the sensing means with a high threshold signal indicative of an angular diameter equivalent to a threshold altitude at points in the orbit substantially removed from and spaced symmetrically with respect to the perigee of the orbit, between which points a spacecraft motor is to be activated, the first comparator means including means for generating a spacecraft motor control signal, to activate a spacecraft motor at relatively low thrust over a relatively long segment of the spacecraft orbit extending between the points at which the threshold altitude is sensed, whereby the signal provided by the sensing means has a relatively high rate of change at the level of the threshold signal, to facilitate precise detection of the threshold and generation of the spacecraft motor control signal; and second comparator means for comparing the signal provided by the sensing means with a low threshold value indicative of the altitude of the desired orbit, whereby the second comparator means generates a signal when the spacecraft first reaches the desired altitude.

4. A method for controlling a spacecraft during transition at low acceleration from an initial elliptical orbit about a celestial body to a target orbit about the same body, the method comprising the steps of:

initially activating a rocket motor for a selected period, to begin transition from the initial orbit;

continually sensing the angular diameter of the celestial body;

comparing the sensed angular diameter with a predetermined upper threshold value corresponding to a threshold orbital altitude at points in the orbit substantially removed from and spaced symmetrically with respect to the perigee, between which points the rocket motor is to be activated, whereby the sensed angular diameter has a relatively high rate of change at the level of the threshold value, to facilitate precise comparison with the threshold and generation of a spacecraft motor control signal;

activating the rocket motor at relatively low thrust over a relatively long segment of the spacecraft orbit extending between the points at which the threshold altitude is sensed, as determined whenever the sensed angular diameter exceeds the upper threshold value; and deactivating the rocket motor whenever the sensed angular diameter is less than the upper threshold value.

5. A method as set forth in claim 4, and further including the steps of:

comparing the sensed angular diameter with a predeterminned lower threshold value, indicative of the target orbital altitude; and indicating completion of the first phase of orbital transfer, in which the low point of the orbit has been raised to the target altitude.

6. A method as set forth in claim 5, in which:

the step of continually sensing the angular diameter is effected by at least two conical earth sensors; and the step of comparing includes comparing output signals from at least two of the sensors with the same threshold level, and ANDing the results of the comparisons, to obtain agreement of at least two sensors before activating the motor.

7. A method as set forth in claim 6, in which:

the step of continually sensing includes sensing with at least three conical earth sensors; and the method further includes the step of selecting two sensing signals from the at least three conical earth sensors.

8. An autonomous controller for use in a spacecraft, to effect a transition at low acceleration from one elliptical orbit about a celestial body to another such orbit, the controller comprising:

at least two sensing means located entirely on board the spacecraft, for providing a signal indicative of the angular diameter of the celestial body;

at least two comparator means, for comparing the signal provided by the sensing means with a threshold signal indicative of an angular diameter equivalent to an altitude at a point in the orbit substantially removed from the apogee and perigee, at which point a spacecraft motor is to be controlled, the comparator means including means for generating a spacecraft motor control signal, whereby the signal provided by the sensing means has a relatively high rate of change at the level of the threshold signal, to facilitate precise detection of the threshold and generation of the spacecraft motor control signal;

means for logically ANDing the control signals from the comparator means, to provide a more reliable indication that a desired altitude has been reached;

an on-board timer for generating a control signal for initiation of a first motor burn period;

a logical OR gate for combining the control signal from the timer with the control signals from the means for logically ANDing the comparator means signals; and means for connecting the output of the OR gate to control the motor, whereby the motor is activated either by the timer or by detection of a threshold altitude by the sensors.

9. An autonomous controller for use in a spacecraft, to effect a transition at low acceleration from one elliptical orbit about a celestial body to another, higher orbit, the controller comprising:

at least two sensing means located entirely on board the spacecraft, for providing signals indicative of the angular diameter of the celestial body;

first comparator means, for comparing the signals provided by the sensing means with a high threshold signal indicative of an angular diameter equivalent to an altitude at a point in the orbit substantially removed from the perigee of the orbit, below which point a spacecraft motor is to be activated, the first comparator means including means for generating at least two separate spacecraft motor control signals, whereby the signals provided by the sensing means have a relatively high rate of change at the level of the threshold signal, to facilitate precise detection of the threshold and generation of the spacecraft motor control signal;

second comparator means for comparing the signals provided by the sensing means with a low threshold value indicative of the altitude of the desired orbit, whereby the second comparator means generates at least two separate signals when the spacecraft first reaches the desired altitude; and means for logically ANDing the output signals from the first comparator means, and independently ANDing the output signals from the second comparator means, to provide a more reliable indication that a desired altitude has been reached.

10. An autonomous controller as set forth in claim 9, and further comprising:

an on-board timer for generating a control signal for initiation of a first motor burn period;

a logical OR gate for combining the control signal from the timer with the control signals from the means for logically ANDing the first comparator means signals; and means for connecting the output of the OR gate to control the motor, whereby the motor is activated either by the timer or by detection of a threshold altitude by the sensors.

11. An autonomous controller for use in a spacecraft, to effect a transition at low acceleration from one elliptical orbit about the earth to another, higher orbit, the controller comprising:

at least two conical earth sensors located entirely on board the spacecraft, for providing a signal indicative of the angular diameter of the earth as viewed from the spacecraft;

first comparator means, for comparing the signal provided by each of the two conical earth sensors with a high threshold signal indicative of an angular diameter at a point in the orbit substantially removed from the perigee, below which point a spacecraft motor is to be activated, the first comparator means including means for generating a spacecraft motor control signal, whereby the signal provided by the conical earth sensors has a relatively high rate of change at the level of the threshold signal, to facilitate precise detection of the threshold and generation of the spacecraft motor control signal;

second comparator means for comparing the signal provided by each of the conical earth sensors with a low threshold value indicative of the altitude of the desired orbit, whereby the second comparator means generates a signal when the spacecraft reaches the desired altitude;

first and second AND gates for logically ANDing the output signals from the first and second comparator means, respectively, to provide a control signal only when there is agreement between the two conical earth sensors;

an on-board timer to initiate at least a first motor burn at a preselected time; and an OR gate for combining control signals from the timer and from the first AND gate, the output of the OR gate being coupled to control the motor.

12. An autonomous controller as set forth in claim 11, and further including:

a third conical earth sensor providing identical altitude information to that provided by the first two sensors;

signal selection means, for selecting two of the three sensors outputs for further use by the controller.

* * * * *